US 6,732,244 B2
(12) United States Patent
Ashton et al.

(10) Patent No.: US 6,732,244 B2
(45) Date of Patent: May 4, 2004

(54) INSTANT VIRTUAL COPY TECHNIQUE WITH EXPEDITED CREATION OF BACKUP DATASET INVENTORY FROM SOURCE DATASET INVENTORY

(75) Inventors: Lyn Lequam Ashton, Tucson, AZ (US); Anthony Steve Pearson, Tucson, AZ (US); Savur Anand Rao, San Jose, CA (US); John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 10/055,297

(22) Filed: Jan. 22, 2002

(65) Prior Publication Data

US 2003/0140204 A1 Jul. 24, 2003

(51) Int. Cl.⁷ .................................................. C06F 12/00
(52) U.S. Cl. ...................... 711/162; 711/161; 707/204; 707/203
(58) Field of Search ................................. 711/161, 162; 707/204, 203

(56) References Cited

U.S. PATENT DOCUMENTS

| 5,410,667 | A | * | 4/1995 | Belsan et al. | 711/114 |
|---|---|---|---|---|---|
| 5,644,698 | A | | 7/1997 | Cannon | 395/182.04 |
| 5,907,672 | A | | 5/1999 | Matze et al. | 395/182.06 |
| 6,029,179 | A | | 2/2000 | Kishi | 707/202 |
| 6,199,074 | B1 | | 3/2001 | Kern et al. | 707/204 |
| 6,202,071 | B1 | | 3/2001 | Keene | 707/202 |
| 6,611,901 | B1 | * | 8/2003 | Micka et al. | 711/162 |

OTHER PUBLICATIONS

"Losing access to your data is no longer a typical pitfall for point–in–time volume copies!", *Mainstar: Mirroring Solutions/Volume Conflict Rename*.
"Volume Conflict Rename for ESS and RVA DASD User Guide" *Mainstar Software VCR User Guide*, pp. 1–25.
"Restoring Data From DASD Volumes Having Hardware Errors", *IBM Technical Disclosure Bulletin*, vol. 31, No. 7, Dec. 1988, pp. 313–317.
"Use of a Single Microprocessor for DASD–Tape Streaming through Two Channels", *IBM Technical Disclosure Bulletin*, vol. 22, No. 9, Feb. 1980, pp. 4194–4195.
"SAP Data Synchronization Mass Control Data conversion Solution for Configuration Data and Associated Master Data and Transactional Data", *1552/Research Disclosure*, Nov. 1999.

* cited by examiner

*Primary Examiner*—Kevin Verbrugge
*Assistant Examiner*—Mehdi Namazi
(74) *Attorney, Agent, or Firm*—Dan Hubert (57) ABSTRACT

A method of copying a body of source data is shown, with rapid creation of an a backup dataset inventory. While write operations to the source data are temporarily suspended, a backup manager conducts an instant virtual copy of the source data creating a backup copy. Also while write operations are being suspended, the backup manager captures contents of a source dataset inventory cross-referencing datasets in the source data and locations in the body of source data where the datasets are stored. After the copy operation completes and writes to the source data resume, the backup manager adds the captured backup contents to a backup dataset inventory cross-referencing datasets in the backup copy and locations where the backup copy datasets are stored in the backup copy.

17 Claims, 4 Drawing Sheets

INSTANT VIRTUAL COPY TECHNIQUE WITH EXPEDITED CREATION OF BACKUP DATASET INVENTORY FROM SOURCE DATASET INVENTORY

BACKGROUND OF THE INVENTION

1. Field of the Invention

The present invention relates to the copying of source data that resides in one or more direct access storage devices (DASDs). More particularly, the invention concerns a copy method that, while write operations to source data are suspended, performs an instant virtual copy of the source data and also captures contents of a source dataset inventory. Later, the captured contents are used to create and/or update an analogous inventory for backup datasets.

2. Description of the Related Art

A number of DASD subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of any physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

With such benefits, instant virtual copy has been an important development in modern DASD subsystems, and a number of different embodiments have surfaced. As one example, International Business Machines Corporation (IBM) has developed the "FLASH COPY" technique, as described in different publications including U.S. application Ser. No. 09/347,344, filed on Jul. 2, 1999 and entitled "Method, System, and Program for Maintaining Electronic Data as of a Point-In-Time." A different fast replicate technique is the "SNAPSHOT" technique disclosed in U.S. Pat. No. 5,410,667 entitled "Data Record Copy System for a Disk Drive Array Data Storage Subsystem," which issued on Apr. 25, 1995. The foregoing references are hereby incorporated herein by reference.

Instant virtual copy techniques have been developed, at least in part, to quickly create a duplicate copy of data without interrupting or slowing foreground processes. A natural extension of this function has been the creation of a physical "backup" copy of the source data, to aid in disaster recovery. Under one such technique, an operation such as "FLASH COPY" or "SNAPSHOT" operation is used to perform an instant virtual copy operation; this creates a virtual target volume identical to the source volume in all respects. Then, the target volume is taken off-line, which may occur automatically as a result of the instant virtual copy operation or manually at the direction of a system administrator.

Although the foregoing technique is useful in some respects, there are still certain challenges. Normal instant virtual copy operations can involve tens of thousands of files. Under these circumstances, it can be difficult to locate a particular dataset on a backup volume since the backup datasets are not catalogued. The usual procedure is to identify the source dataset on a source volume and then utilize other directories to identify the backup volume counterpart to that source volume. Then, the backup dataset is located by reviewing an inventory such as a volume table of contents (VTOC) aboard the backup volume. In another embodiment, an independent background process reviews contents of the backup volumes and creates an appropriate backup dataset inventory. This process, however, is consumptive of time and processing resources. Furthermore, if the source volume fails before the lengthy backup dataset inventory is compiled, the effort expended toward compiling this inventory is completely wasted.

For the foregoing reasons, then, known backup processes based on the instant virtual copy technique are not completely adequate for some applications due to certain unsolved problems.

SUMMARY OF THE INVENTION

A process of copying a body of source data is shown, where a backup manager quickly creates an accurate backup dataset inventory. While write operations to the source data are temporarily suspended, the backup manager performs an instant virtual copy upon the source data to create a backup copy. Also during this time, the backup manager captures contents of a source dataset inventory cross-referencing datasets in the source data and locations where those datasets are stored. The capture operation is especially rapid, and may be performed by reading the source dataset inventory into memory, performing an instant virtual copy of data including the source dataset inventory, copying the inventory into nonvolatile storage, etc. After the copy operation completes and writing of the source data resumes, the backup manager incorporates the captured source dataset inventory into a backup dataset inventory cross-referencing the names of datasets in the backup copy and their locations in the backup copy. Later, when a request occurs to access a particular backup dataset, the backup manager accesses the backup dataset inventory to locate the specified dataset in the backup copy, and ultimately accesses the specified dataset from that storage location.

Optionally, this process may be further enhanced in a number of different ways. For instance, where the source data is stored on a number of different storage media, an additional step may be performed before starting the backup operations. Namely, each source storage medium is paired with a counterpart backup storage medium having predetermined characteristics that match characteristics of the source storage medium. This effectively reserves the backup storage media before creating the backup copy.

Another optional enhancement concerns the use of copy pools. The invention may receive operator input of a "copy pool" providing a shorthand reference for a specific group of source volumes. This shorthand eases the burden on operators to painstakingly specify multiple volumes for each time a storage operation involving those volumes is performed. Furthermore, when the copy pool definition is amended, this automatically applies whenever the copy pool is used in any future storage operations.

The foregoing features may be implemented in a number of different forms. For example, the invention may be implemented to provide a backup copy method. In another embodiment, the invention may be implemented to provide an apparatus such as a storage system or backup manager component configured to perform backup copy operations as discussed herein. In still another embodiment, the invention may be implemented to provide a signal-bearing medium tangibly embodying a program of machine-readable instructions executable by a digital data processing apparatus to perform backup copy operations. Another embodiment concerns logic circuitry having multiple interconnected electrically conductive elements configured to perform backup copy operations.

The invention affords its users with a number of distinct advantages. For example, the invention eases and speeds the process of locating a particular backup dataset because the backup datasets are inventoried. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Introduction

Figure 1:
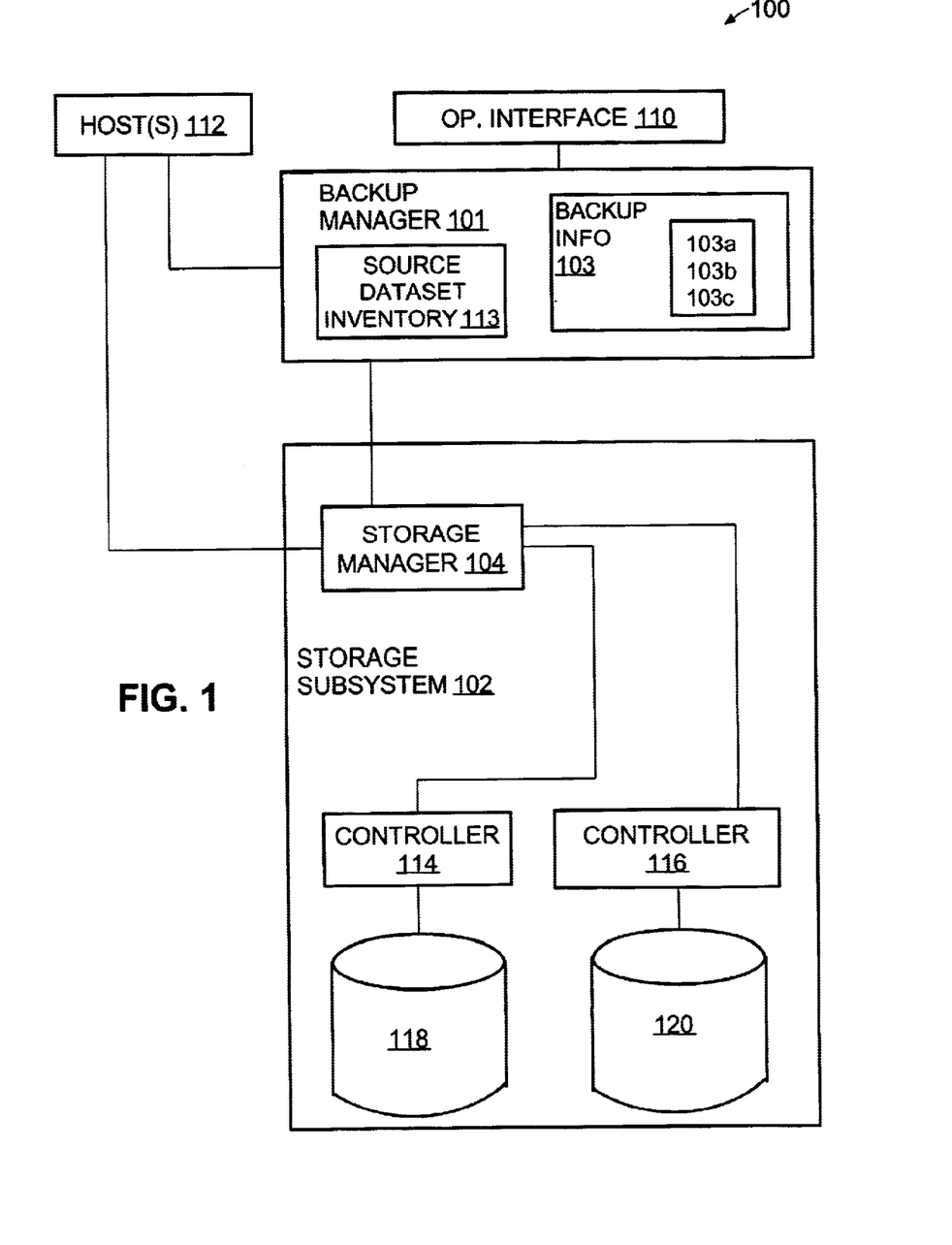
FIG. 1 is a block diagram of the hardware components and interconnections of a data storage system, according to the invention.

One aspect of the invention concerns a data storage system, which may be embodied by various hardware components and interconnections, with one example being described by the digital data storage system 100 of FIG. 1. In the illustrated example, the system 100 includes a backup manager 101, storage subsystem 102, operator interface 110, and one or more hosts 112. Among other components, the storage subsystem 102 includes a storage manager 104, along with direct access storage devices (DASDs) 118, 120 and their associated controllers 114, 116. The system may also include magnetic tape or any other storage media. The storage manager 104 manages read/write operations upon the DASD 118, 120 in response to stimuli from sources such as external user applications such as those running on hosts 112, a system administrator via the operator interface 110, the backup manager 101, and/or internal processes of the storage manager 104. The hosts 112 may comprise application programs, computing machines, human operator terminals, another device, or a combination of the foregoing. The operator interface 110 may include features such as a computer, input/output terminal, keyboard, video monitor, dials, switches, or other human/machine interface.

Backup Manager

Considering the components of FIG. 1 in greater detail, the backup manager 101 comprises a processing entity that directs the storage subsystem 102 to backup customer data upon the DASDs 118, 120. The backup manager 101 includes or has access to backup information 103 and a source dataset inventory 113, described below. Each of the inventory 113 and/or backup information 103 may be embodied in various storage constructs, depending upon the implementation specifics of the backup manager 101. Some examples include memory or storage buffers, registers, files, directories, partitions, subassemblies, physical devices, logical devices, cards, or any other suitable construct(s) for housing data in magnetic disk storage, battery-supported RAM, optical storage, magnetic tape, or another storage media. Contents of the inventory 113 and backup information 103 are described in greater detail below. The backup manager 101 is coupled to the interface 110 and host(s) 112 to receive directions and other input therefrom. In one implementation, the operator interface 110 includes a software module to process operator commands for input to the backup manager 101.

Storage Subsystem

One example of the storage subsystem 102 is a machine such as a storage manager component of an IBM brand ESS 2105 machine. The storage subsystem 102 receives instructions and data from the host(s) 112, backup manager 101, or a combination thereof. The storage manager 104 directs operations of the storage subsystem 102.

DASD Components

The DASD controllers 114, 116 manage read/write operations upon DASD storage media 118, 120 as directed by the storage manager 104. DASD storage 118, 120 is exemplified by magnetic disk type storage in the present discussion, which may be implemented as a redundant array of inexpensive disks (RAID) storage. In this example, the DASD controller 114, 116 and storage 118, 120 may be implemented by using a commercially available product such as an IBM Enterprise Storage Server (ESS).

The controllers 114, 116 manage the DASDs 118, 120 according to home area architecture, log structured array, or another storage strategy. For ease of explanation, the invention as illustrated herein utilizes home area architecture. Also as illustrated, the storage manager 104 manages data of the DASDs 118, 120 according to "volumes," which are actually "logical" volumes because they do not exist in any physical embodiment. Instead of volumes, however, the storage manager 104 may manage data according to any other useful data unit, such as physical device, logical device, logical surface or cylinder, sector, collection of pages, address range(s), etc. The controllers 114, 116 receive data access requests from the storage manager 104 in terms of logical volumes, and implement the data access requests by translating them into terms of physical storage locations on the physical disks used to implement the DASD storage 118, 120.

More Detail: Data and Metadata

Figure 2:
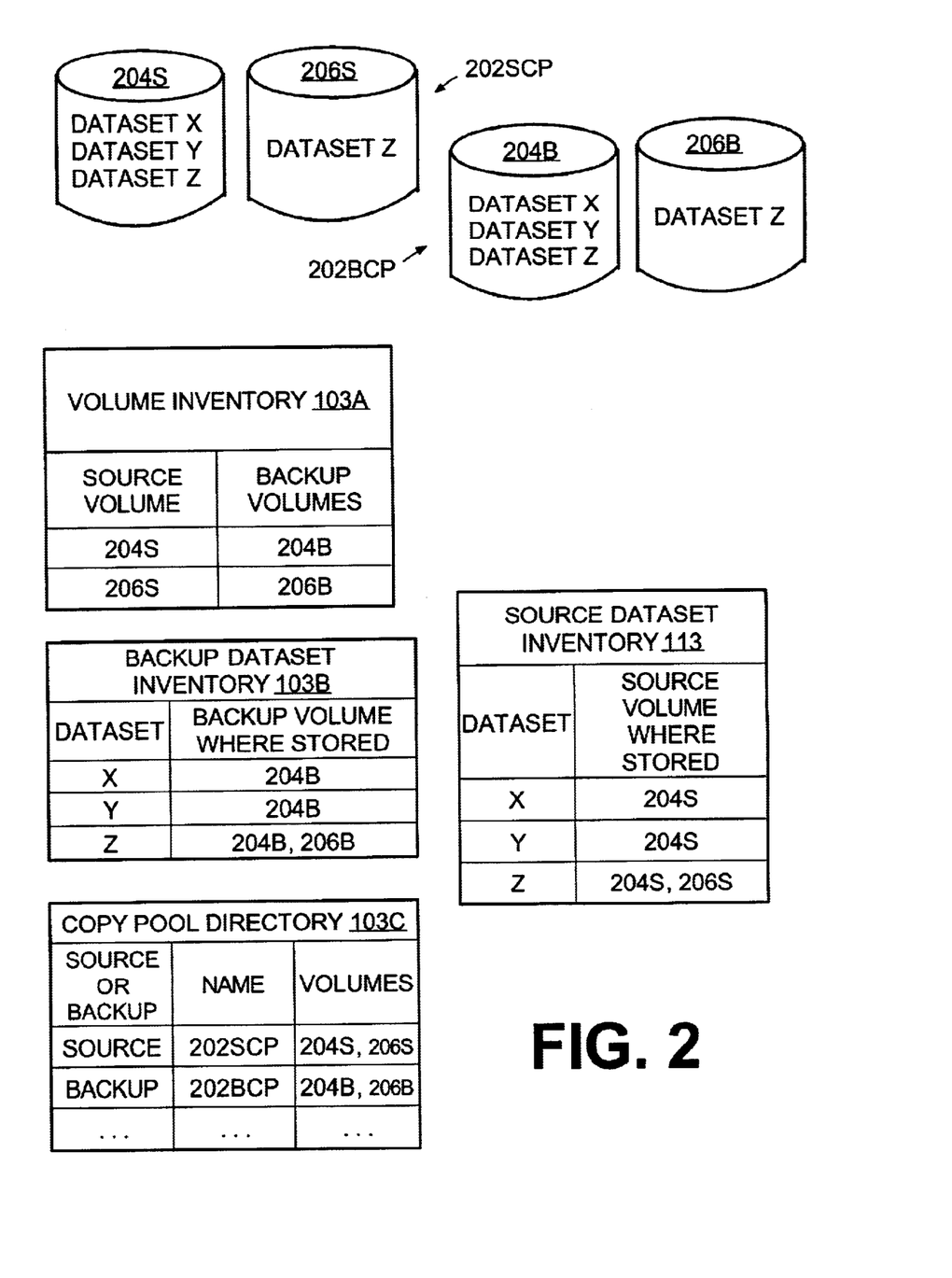
FIG. 2 is a block diagram showing exemplary source and backup volumes and their datasets, as well as various source and backup information of the invention.

FIG. 2 shows exemplary source and backup volumes and their datasets, as well as various inventories and directories of the invention. Each of the source volumes 204s, 206s as illustrated comprises a logical volume of data present in one or more of the DASDs 118, 120. The source volume 204s includes dataset X, dataset Y, and a first part of dataset Z. Each dataset may comprise one or more files, pages, bytes, records, tables, or other units of data. The source volume 206s includes a second part of dataset Z. Together the source volumes 204s, 206s make up a source copy pool 202scp.

The "target" or "backup" volumes 204b, 206b correspond to the source volumes 204s, 206s. Like the source volumes, each backup volume 204b, 206b as illustrated comprises a logical volume of data that is present in one or more of the DASDs 118, 120. The backup volume 204b includes copies of dataset X, dataset Y, and a first part of dataset Z. The backup volume 206*b* includes a second part of dataset Z. Together, the backup volumes 204*b*, 206*b* make up a backup copy pool 202*bcp*.

As mentioned above, the underlying data of the volumes 204*s*, 206*s*, 204*b*, and 206*b* exist in the DASDs 118, 120. FIG. 2 also illustrates various metadata constructs 113, 103*a*–103*c* that reside in the backup manager 101. Namely, the source dataset inventory 113 lists each source dataset in the volumes 204*s*, 206*s* cross-referenced against its source volume. For example, the inventory 113 shows that source dataset X is located in source volume 204*s*. Similar in purpose to the source dataset inventory 113, the backup dataset inventory 103*b* lists each backup dataset in the volumes 204*b*, 206*b* cross-referenced against its backup volume. For example, the inventory 103*b* shows that the backup dataset X is located in the backup volume 204*b*.

The volume inventory 103*a* identifies corresponding source and backup volumes. For instance, the inventory 103*a* shows that source volume 204*s* corresponds to backup volume 204*b*. In other words, backup volume 204*b* replicates source volume 204*s*. The copy pool directory 103*c* contains the definition of each copy pool. For instance, the directory 103*c* shows that the copy pool 202*scp* is comprised of volumes 204*s*, 206*s*.

Exemplary Digital Data Processing Apparatus

As mentioned above, processing entities such as the backup manager 101 and storage manager 104 may be implemented in various forms. One example is a digital data processing apparatus, as exemplified by the hardware components and interconnections of the digital data processing apparatus 300 of FIG. 3.

Figure 3:
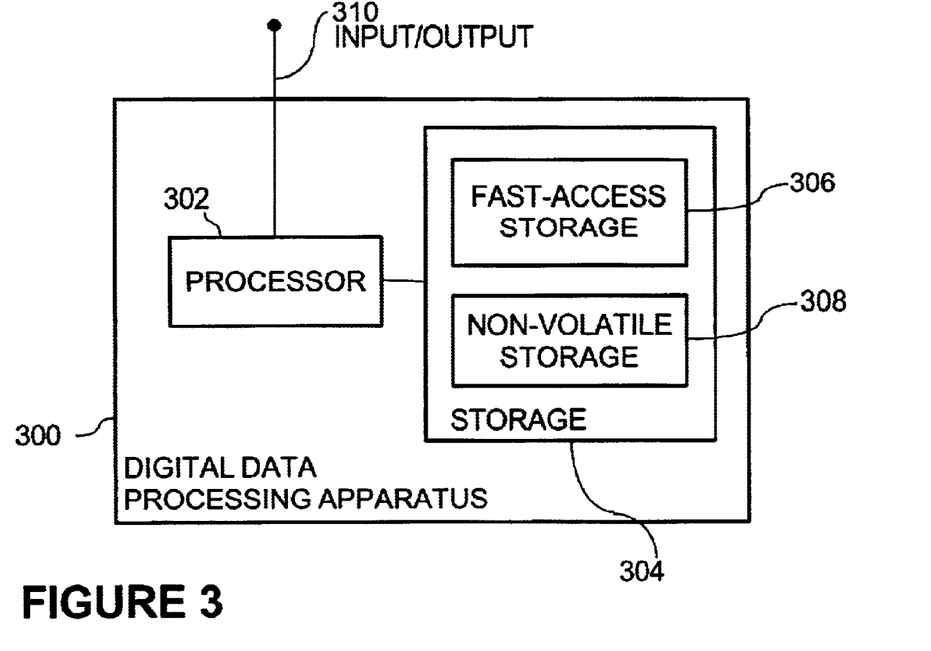
FIG. 3 is a block diagram of a digital data processing machine according to the invention.

The apparatus 300 includes a processor 302, such as a microprocessor, personal computer, workstation, or other processing machine, coupled to a storage 304. In the present example, the storage 304 includes a fast-access storage 306, as well as nonvolatile storage 308. The fast-access storage 306 may comprise random access memory (RAM), and may be used to store the programming instructions executed by the processor 302. The nonvolatile storage 308 may comprise, for example, battery backup RAM, EEPROM, one or more magnetic data storage disks such as a "hard drive," a tape drive, or any other suitable storage device. The apparatus 300 also includes an input/output 310, such as a line, bus, cable, electromagnetic link, or other means for the processor 302 to exchange data with other hardware external to the apparatus 300.

Despite the specific foregoing description, ordinarily skilled artisans (having the benefit of this disclosure) will recognize that the apparatus discussed above may be implemented in a machine of different construction, without departing from the scope of the invention. As a specific example, one of the components 306, 308 may be eliminated; furthermore, the storage 304, 306, and/or 308 may be provided on-board the processor 302, or even provided externally to the apparatus 300.

Logic Circuitry

In contrast to the digital data processing apparatus discussed above, a different embodiment of the invention uses logic circuitry instead of computer-executed instructions to implement processing entities such as the backup manager 101 and the storage manager 104. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Operation

Having described the structural features of the present invention, the operational aspect of the present invention will now be described. As mentioned above, the operational aspect of the invention generally involves a copy method. While write operations to source data are suspended, this process conducts an instant virtual copy and also captures contents of a source dataset inventory. Later, the captured contents are used to create and/or update an analogous inventory for backup datasets.

Signal-bearing Media

Figure 4:
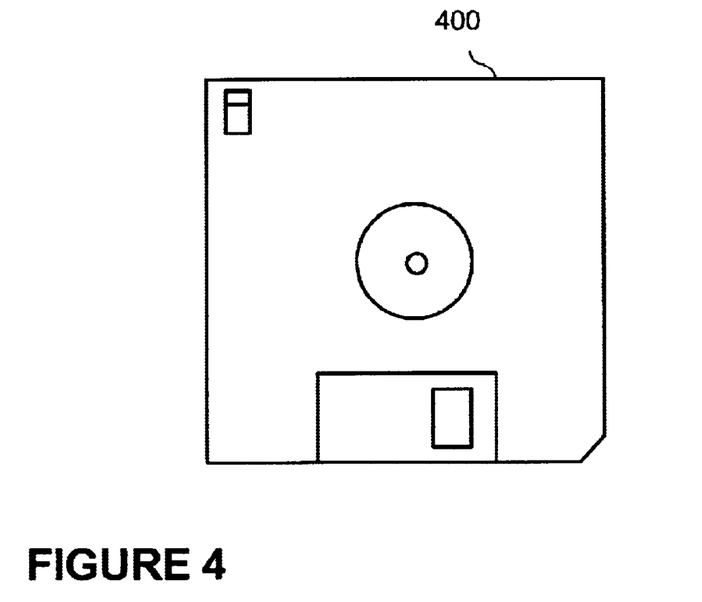
FIG. 4 shows an exemplary signal-bearing medium according to the invention.

Wherever the functionality of the invention is implemented using a machine-executed program sequence, such a sequence may be embodied in various forms of signal-bearing media. In the context of FIG. 3, this signal-bearing media may comprise, for example, the storage 304 or another signal-bearing media, such as a magnetic data storage diskette 400 (FIG. 4), directly or indirectly accessible by a processor 302. Whether contained in the storage 306, diskette 400, or elsewhere, the instructions may be stored on a variety of machine-readable data storage media. Some examples include direct access storage (e.g., a conventional "hard drive," redundant array of inexpensive disks (RAID), or another DASD), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Overall Sequence of Operation

Figure 5:
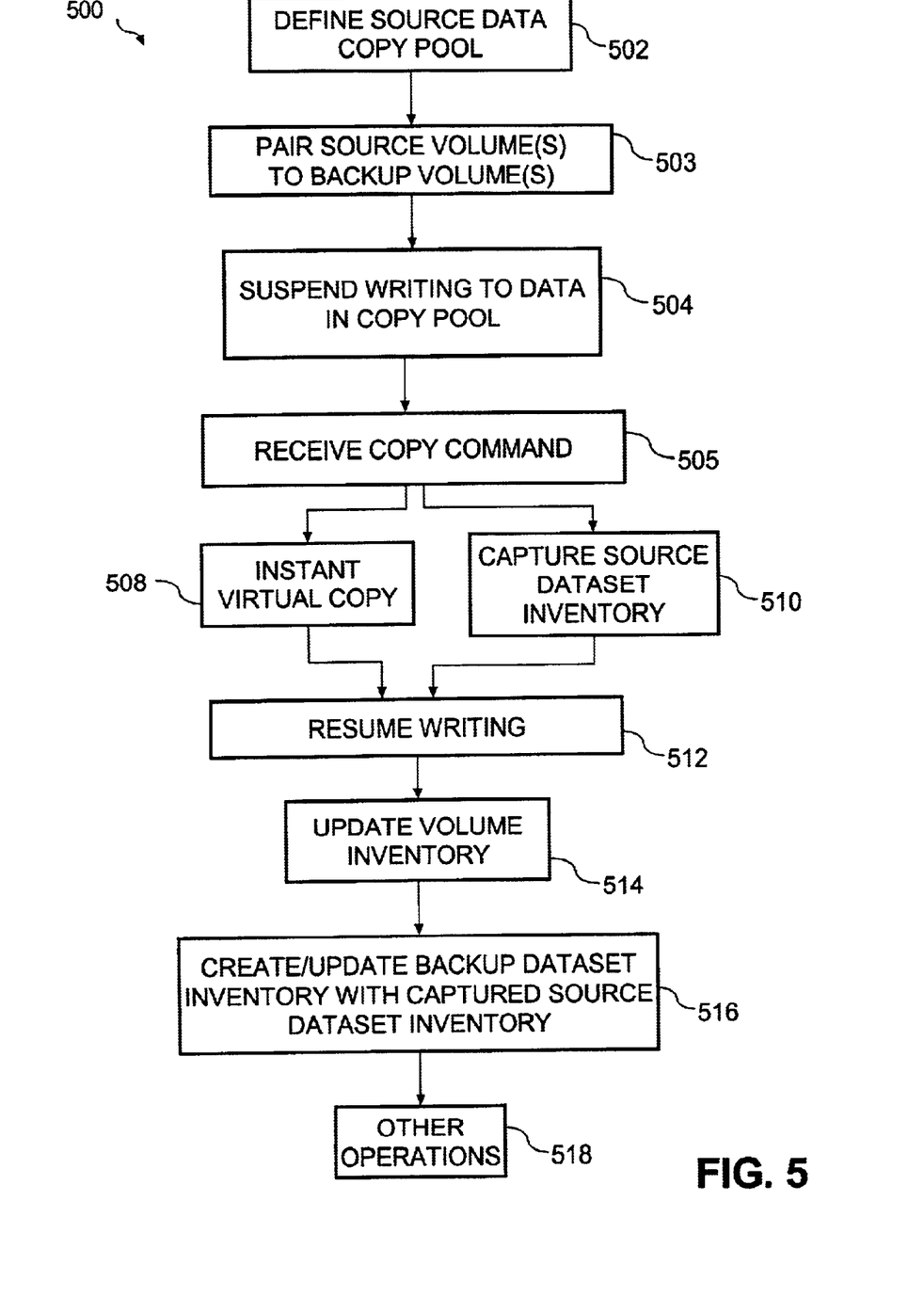
FIG. 5 is a flowchart of an operational sequence for creating backup copies according to the invention.

FIG. 5 shows a sequence 500 to illustrate one example of the method aspect of the present invention. For ease of explanation, but without any intended limitation, the example of FIG. 5 is described in the context of the system 100 as specifically described above. The sequence 500 begins in step 502 where the backup manager 101 receives definition of at least one "copy pool" of source data. The copy pool definitions may be received from various sources, including a human operator (via the interface 110), or from the host 112 or another source via the host 112 or interface 110. As mentioned above, each copy pool is shorthand for a desired body of data in the DASDs 118, 120, and in the illustrated embodiment specifies one or more volumes, although any other unit of data may be used. An exemplary source copy pool is shown by 202*scp* (FIG. 2). Because the backup manager 101 automatically recognizes the copy pools as shorthand for the underlying data, this will expedite future user entry of storage commands. For instance, the backup manager 101 may recognize when data management commands from the interface 110 and host 112 utilize copy pools, and in such cases, utilize the copy pool directory 103c to identify the underlying volumes upon which to perform the data management command. Since the sequence 500 may be performed without using copy pools, however, step 502 is optional. Furthermore, although shown here in one continuous sequence, step 502 may be performed independently of any instant virtual copy operation. Accordingly, step 502 may be performed at any time the making of a backup copy is contemplated.

In step 503, the backup manager 101 pairs the source volumes (to be copied) of step 502 with an equal number of available backup volumes, in anticipation of a possible future copy operation. In the example of FIG. 2, step 503 pairs source volumes 204s, 206s with backup volumes 204b, 206b, respectively. As this pairing anticipates future copy operations, it serves to speed their ultimate completion. And since various operations are suspended while the copy operations complete (as discussed below), the pre-pairing of step 503 helps minimize any down-time of applications at the host 112 during copying. Alternatively, step 503 may be performed at another time, such as "on demand," or automatically after step 504, etc.

In step 504, the host 112 "suspends" its writing to the source copy pool 202scp in anticipation of that host issuing a copy or backup command. In this disclosure, this operation is referred to as "write-suspend." Write-suspend may be performed by various host entities, such as each individual host application program seeking backup, a central backup coordination facility in the host, or another processing entity, machine, processing thread, etc. For ease of reference, write-suspend is discussed as being performed by the "host."

The host may implement write-suspend by performing any suitable technique that does not risk the possibility of creating an invalid backup copy. For example, write-suspend techniques are not permissible if they permit writing to the source data in a way that destroys the correspondence between source and backup volumes. In other words, backup data is only valid if, after a recovery process using the backup data is fully applied, the backup data matches the source data for a given point in time. Step 504 is initiated by the host 112 (and any devices under its control). Some exemplary techniques to suspend writing to the source copy pool 202scp include:

1. The host managing host applications so that they do not conduct any writes to data of the source copy pool 202scp.
2. The host buffering all data submitted by host applications for writing to the source copy pool 202scp, and deferring actual writing of any buffered data until after lifting write-suspend.
3. The host instructing one or more data storage devices containing the source copy pool 202scp to refrain from writing during write-suspend.
4. The host permitting host applications to continue to write to the source data, with the host or its application logging such writes to a log file.
5. The host permitting atomic writes, and non-atomic writes on a limited basis. "Atomic" writes are those that are done "in-place" that can be done in a single I/O request with only one track or contiguous extent of tracks involved. The storage subsystem ensures that an atomic write is done without interruption. Atomic writes are permitted, although they are still logged, such as by using undo, re-do, or other logs that allow backup data to be restored to a consistent state at a given time. As for non-atomic writes, they are processed by a technique such as one of the following: (a) requiring the host application to wait until suspension is lifted, or (b) buffering non-atomic write data and deferring actual writing of the buffered data until suspension is lifted.
6. The host failing the writes, and notifying the host application that the write did not succeed. This allows the host application to perform (a) wait until suspension is lifted and try again, or (b) reverse the transaction that this write was involved with.

Optionally, the backup manager 101 in step 504 may communicate with the hosts 112 to confirm that write-suspend is in place.

In step 505, the backup manager 101 receives a copy command from the host 112 or interface 110. This command comprises instructions to copy a body of source data. The copy command may comprise a copy command alone, or a copy operation as part of another larger operation such as data migration, data move, etc. The copy command specifies a body of source data, which in this example comprises multiple source volumes identified by the source copy pool of step 502. Responsive to receiving the host copy command, the backup manager 101 may confirm (if not already confirmed in step 504) that write-suspend is underway.

Responsive to the copy command of step 505, the backup manager 101 utilizes the copy pool directory 103c to identify the underlying source volumes that make up the copy pool specified in the copy command of step 505, and then performs steps 508, 510 concurrently. In step 508, the backup manager 101 performs an instant virtual copy operation (such as FLASH COPY) based upon the source copy pool. In step 510, the backup manager 101 captures the source dataset inventory 113. Step 510 may be performed by any suitably fast method, to minimize the time that write data is suspended. For instance, the source data inventory 113 may be copied by instant virtual copy, by reading the inventory into temporary memory, by performing a disk copy, or by another appropriate replication technique. Importantly, step 510 is performed while write operations are suspended in order to take advantage of the natural inactivity of the source dataset inventory during operation 508, and thereby avoid interrupting, suspending, or otherwise disturbing the source dataset inventory.

After steps 508, 510, step 512 ends write-suspend. This may be accomplished, for example, by the backup manager 101 notifying the host 112 that the write suspension may be lifted, and in turn, the host 112 resuming writing data to the source copy pool 202scp. After step 512, the backup manager 101 updates the volume inventory 103a by cross-referencing source volume 204s against counterpart backup volume 204b, and source volume 206s against backup volume 206b. Next, in step 516, the backup manager 101 creates a backup dataset inventory, or updates an existing backup dataset inventory for the backup volumes involved in step 508. The backup dataset inventory is shown by 103b (FIG. 2). Step 516 is performed by incorporating the captured source data inventory 113 (from step 510) into the backup dataset inventory 103b being updated/created in step 516.

Various other operations 518 may be performed after completing the previous operation. For example, the backup manager 101 may receive a request to access a backup dataset, in the form of a RECOVER query, tail deletion, etc. Dataset X is used as an example. This request may come from the hosts 112, the interface 110, etc., and it may occur any time after the operation 516 completes. In response to this request to access backup dataset X, the backup manager 101 retrieves dataset X from backup volume 204b. This is achieved by first consulting the backup dataset inventory 103b to locate dataset X, and once located, accessing the volume 204b containing that dataset.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of copying a body of source data, comprising operations of:
    while write operations to a body of source data are temporarily suspended, performing backup operations comprising:
        performing an instant virtual copy of the source data creating a backup copy;
        capturing contents of a source dataset inventory cross-referencing datasets in the source data and locations in the body of source data where the datasets are stored;
    adding the captured contents to a backup dataset inventory cross-referencing datasets in the backup copy and locations in the backup copy where the backup copy datasets are stored.

2. The method of claim 1, the source data being stored on a number of source logical storage volumes, the operations further comprising prior to the backup operations, pairing each source logical storage volume with a counterpart backup logical storage volume, where the operation of performing the instant virtual copy utilizes the backup logical storage volume to locate the backup copy.

3. The method of claim 1, the operations further comprising suspending write operations to the body of source data during the performing and capturing operations, the suspending comprising at least one of the following:
    preventing applications from conducting any writes to the source data;
    buffering all data transmitted by applications for writing to the source data, and deferring writing of the buffered data until after the suspending operation;
    instructing one or more data storage devices containing the body of source data to refrain from writing;
    permitting applications to continue to write to the source data, and logging such writes;
    permitting applications to continue to perform atomic writes, logging such atomic writes, and deferring completion of non-atomic writes until after write-suspend;
    failing applications' write requests and notifying the applications that the write did not succeed.

4. The method of claim 1, the operations further comprising temporarily suspending write operations to the body of source data, comprising:
    permitting applications to write to the source data insofar as writing is consistent with validity of the backup copy.

5. The method of claim 1, the operations further comprising:
    receiving operator input designating the source data by specifying a copy pool representing multiple volumes of source data.

6. The method of claim 1, the source data including a number of logical volumes, the backup copy including a number of different logical volumes, the operations further comprising:
    after completion of the backup operations, creating a record mapping between the logical volumes of source data and the logical volumes of backup data.

7. The method of claim 1, further comprising:
    accessing the backup dataset inventory to locate a specified dataset in the backup copy;
    accessing contents of the specified dataset in the backup copy.

8. A signal-bearing medium tangibly embodying a program of machine-readable instructions executable by a digital processing apparatus to perform a method for copying a body of source data, said operations comprising:
    while write operations to a body of source data are temporarily suspended, performing backup operations comprising:
        performing an instant virtual copy of the source data creating a backup copy;
        capturing contents of a source dataset inventory cross-referencing datasets in the source data and locations in the body of source data where the datasets are stored;
    adding the captured contents to a backup dataset inventory cross-referencing datasets in the backup copy and locations in the backup copy where the backup copy datasets are stored.

9. The medium of claim 8, the source data being stored on a number of source logical storage volumes, the operations further comprising prior to the backup operations, pairing each source logical storage volume with a counterpart backup logical storage volume, where the operation of performing the instant virtual copy utilizes the backup logical storage volume to locate the backup copy.

10. The medium of claim 8, the operations further comprising suspending write operations to the body of source data during the performing and capturing operations, the suspending comprising at least one of the following:
    preventing applications from conducting any writes to the source data;
    buffering all data transmitted by applications for writing to the source data, and deferring writing of the buffered data until after the suspending operation;
    instructing one or more data storage devices containing the body of source data to refrain from writing;
    permitting applications to continue to write to the source data, and logging such writes;
    permitting applications to continue to perform atomic writes, logging such atomic writes, and deferring completion of non-atomic writes until after write-suspend;
    failing applications' write requests and notifying the applications that the write did not succeed.

11. The medium of claim 8, the operations further comprising temporarily suspending write operations to the body of source data, comprising:
    permitting applications to write to the source data insofar as writing is consistent with validity of the backup copy.

12. The medium of claim 8, the operations further comprising:
receiving operator input designating the source data by specifying a copy pool representing multiple volumes of source data.

13. The medium of claim 8, the source data including a number of logical volumes, the backup copy including a number of different logical volumes, the operations further comprising:
after completion of the backup operations, creating a record mapping between the logical volumes of source data and the logical volumes of backup data.

14. The medium of claim 8, further comprising:
accessing the backup dataset inventory to locate a specified dataset in the backup copy;
accessing contents of the specified dataset in the backup copy.

15. A logic circuit of multiple interconnected electrically conductive elements configured to perform operations to perform a method for copying a body of source data, said operations comprising:
while write operations to a body of source data are temporarily suspended, performing backup operations comprising:
performing an instant virtual copy of the source data creating a backup copy;
capturing contents of a source dataset inventory cross-referencing datasets in the source data and locations in the body of source data where the datasets are stored;
adding the captured contents to a backup dataset inventory cross-referencing datasets in the backup copy and locations in the backup copy where the backup copy datasets are stored.

16. A data storage system, comprising:
digital data storage;
metadata including a source data inventory cross-referencing datasets in the source data and locations in the body of source data where the datasets are stored;
a storage manager coupled to the storage and the metadata, programmed to perform operations to copy a body of source data, comprising:
while write operations to a body of source data are temporarily suspended, performing backup operations comprising:
performing an instant virtual copy of the source data creating a backup copy;
capturing contents of the source dataset inventory;
adding the captured contents to a backup dataset inventory cross-referencing datasets in the backup copy and locations in the backup copy where the backup copy datasets are stored.

17. A data storage system, comprising:
first means for digital data storage;
second means for storing metadata including a source data inventory cross-referencing datasets in the source data and locations in the body of source data where the datasets are stored;
storage manager means for copying a body of source data by:
while write operations to a body of source data are temporarily suspended, performing backup operations comprising:
performing an instant virtual copy of the source data creating a backup copy;
capturing contents of the source dataset inventory;
adding the captured contents to a backup dataset inventory cross-referencing datasets in the backup copy and locations in the backup copy where the backup copy datasets are stored.

* * * * *